Patented Jan. 9, 1951

2,537,690

UNITED STATES PATENT OFFICE 2,537,690

FUNGICIDAL TREATMENT

David T. Mowry, Dayton, Ohio, and Norman R. Piesbergen, Collinsville, Ill., assignors to Monsanto Chemical Company, St. Louis, Mo., a corporation of Delaware No Drawing. Application August 20, 1949, Serial No. 111,575

5 Claims. (Cl. 99—156)

This invention relates to methods of treating fruit to prevent or inhibit the growth of destructive fungi. More particularly the invention relates to the treatment of citrus fruit for the purpose of preventing the development of the fungus which causes "stem-end rot."

Citrus fruit is subject to attack by the fungi, Phomopsis citri and Diplodia natalensis, which produce the effect known to the citrus fruit industry as "stem-end rot." Other objectionable fungi are also common, for example the blue and green penicillia molds. These organisms cause extensive destruction to citrus fruit during storage and shipping. Attempts have been made to treat the fruit with fungicidal compounds to prevent loss of fruit, but many of such compounds are dangerous to use because of injury to the fruit by chemical action. It is known to the art that ethyl carbanilate is effective in destroying the objectionable fungi. The use of this method is not entirely acceptable because of extensive damage to the fruit through chemical scalding of the rind.

The primary purpose of this invention is to provide an improved method of treating fruit to prevent loss by action of fungus. A further purpose of the invention is to provide a fungicide method which does not injure the fruit chemically. Further purposes of the invention will be apparent from the following disclosure.

It has been found that allyl carbanilate is effective in inhibiting the growth of stem-end rot and blue mold producing organisms. The treatment is effected by contacting the citrus fruit with an ethyl alcohol solution of allyl carbanilate, by dipping the fruit, spraying it, or otherwise coating the surface with the solution containing sufficient allyl carbanilate to destroy the fungus spores or inhibit the growth of fungus present. It has been found that solutions containing from 0.5 to ten percent of the allyl carbanilate will be effective in producing the desired effect. Preferred practice involves the use of solutions of from one to five percent by weight.

Further details of the practice and effect of the invention are set forth with respect to the following examples.

Example 1

Oranges were treated with allyl carbanilate and ethyl carbanilate, by subjecting lots of 250 oranges to treatment by means of a five percent alcoholic solution of the compounds. A check was maintained on a separate lot of oranges without the chemicals. The various batches of treated oranges were subjected to a temperature of 70° F., for a period of three weeks. At the end of each week the oranges were examined to determine the number of sound oranges, the number with scalded surfaces and the number in which decay by fungus action had begun. The following table describes the percentages of sound, scalded, and decayed oranges found after each of the three one-week intervals.

|  | Allyl Carbanilate | Ethyl Carbanilate | Control |
|---|---|---|---|
|  | Per cent | Per cent | Per cent |
| One week: |  |  |  |
| Sound Oranges | 95.2 | 29.8 | 94.0 |
| Scalded Surfaces | 4.8 | 69.4 | 0 |
| Decay | 0 | 0.8 | 6.0 |
| Two weeks: |  |  |  |
| Sound Oranges | 76.4 | 11.7 | 41.6 |
| Scalded Surfaces | 17.2 | 85.1 | 0 |
| Decay | 1.6 | 1.2 | 50.8 |
| Three weeks: |  |  |  |
| Sound Oranges | 50.0 | 10.1 | 26.8 |
| Scalded Surfaces | 12.4 | 79.4 | 0 |
| Decay | 31.6 | 9.7 | 67.6 |

Example 2

The fungicidal tests were conducted on oranges using ethyl alcohol solutions of ethyl carbanilate, allyl carbanilate, methallyl carbanilate, 2-chloroallyl carbanilate and propargyl carbanilate. The solutions of five percent, 2.5 percent and 1.25 percent were used of each of the compounds. Lots of oranges varying from 25 to 100 were used for each test and a similar batch of oranges was left untreated to demonstrate the improvement effect in the preservation of oranges by the various chemical treatments. The following tables set forth the percentage of oranges which were unaffected by fungus growth and its incident decomposition. The extent of chemical injury to the surface of the fruit is indicated below the percentage of fungus-free fruit.

| Concen-tration | Ethanol Control | Percent Sound Oranges After 3 Weeks at 70° F. | | | | |
|---|---|---|---|---|---|---|
| | | Ethyl | Allyl | Methallyl | Carbani-late 2-Chlo-roallyl | Propargyl |
| *Percent* 5 | 28 | 83 Moderate Damage | 90 None | 80 Severe Damage | 80 Moderate Damage | 28 Moderate Damage |
| 2.5 | 31 | 75 Slight Damage | 70 None | 72 Slight Damage | 66 Moderate Damage | 32 Moderate Damage |
| 1.25 | 32 | 36 None | 56 None | 54 Slight Damage | 59 Slight Damage | 24 Slight Damage |

In the practice of this invention the oranges may be treated with the fungicide simultaneously with the wax conventionally used to coat oranges before marketing. In such cases the barbanilates, being soluble in many waxes, may be used without the alcohol. The water insoluble carbanilates may alternatively be suspended in an aqueous wax emulsion and thus applied to the oranges.

The invention is defined by the following claims.

We claim:

1. A method of retarding fungus growth on citrus fruit, which comprises contacting the fruit with allyl carbanilate.
2. A method of retarding fungus growth on citrus fruit, which comprises contacting the fruit with a solution of allyl carbanilate.
3. A method of retarding fungus growth on citrus fruit, which comprises contacting the fruit with a solution of from 0.5 to ten percent by weight of allyl carbanilate.
4. A method of retarding fungus growth on citrus fruit, which comprises treating the fruit with an aqueous emulsion containing allyl carbanilate.
5. A method of retarding fungus growth on citrus fruit, which comprises treating the fruit with an aqueous emulsion containing from 0.5 to ten percent by weight of allyl carbanilate.

DAVID T. MOWRY.
NORMAN R. PIESBERGEN.

No references cited.